United States Patent [19]

Hayes

[11] Patent Number: 5,076,817
[45] Date of Patent: Dec. 31, 1991

[54] POLYAMIDE GAS SEPARATION MEMBRANES AND PROCESS OF USING SAME

[75] Inventor: Richard A. Hayes, Parkersburg, W. Va.

[73] Assignee: E. I. Du Pont de Nemours and Company, Wilmington, Del.

[21] Appl. No.: 620,255

[22] Filed: Nov. 30, 1990

[51] Int. Cl.$^5$ .................... B01D 53/22; B01D 71/56
[52] U.S. Cl. .......................................... 55/16; 55/68; 55/158
[58] Field of Search ............................ 55/16, 68, 158; 210/500.38

[56] References Cited

U.S. PATENT DOCUMENTS

| | | | |
|---|---|---|---|
| Re. 30,351 | 7/1980 | Hoehn et al. | 210/500.38 X |
| 3,567,632 | 3/1971 | Richter et al. | 210/500.38 X |
| 3,822,202 | 7/1974 | Hoehn | 55/16 |
| 3,899,309 | 8/1975 | Hoehn et al. | 55/16 |
| 4,217,227 | 8/1980 | Elfert et al. | 210/500 M |
| 4,595,503 | 6/1986 | Schindler et al. | 210/500.38 |
| 4,626,468 | 12/1986 | Sundet | 210/500.38 X |
| 4,627,992 | 12/1986 | Badenhop et al. | 427/244 |
| 4,659,383 | 4/1987 | Lin et al. | 106/27 |
| 4,713,438 | 12/1987 | Harris et al. | 528/337 |
| 4,737,286 | 4/1988 | Badenhop et al. | 210/500.33 |
| 4,761,234 | 8/1988 | Uemura et al. | 210/500.38 |
| 4,770,777 | 9/1988 | Steadly et al. | 210/490 |
| 4,863,496 | 9/1989 | Ekiner et al. | 55/16 X |
| 4,975,190 | 12/1990 | Sakashita et al. | 210/500.38 X |
| 4,997,462 | 3/1991 | Nakatani et al. | 55/16 |

FOREIGN PATENT DOCUMENTS

| | | | |
|---|---|---|---|
| 0077691 | 4/1983 | European Pat. Off. | 210/500.38 |
| 0176107 | 4/1986 | European Pat. Off. | 210/500.38 |
| 0176992 | 4/1986 | European Pat. Off. | 210/500.38 |
| 0179474 | 4/1986 | European Pat. Off. | 55/158 |
| 0219878 | 4/1987 | European Pat. Off. | 55/158 |
| 61-004520 | 1/1986 | Japan | 210/500.38 |
| 63-143924 | 6/1988 | Japan | 55/16 |
| 63-278524 | 11/1988 | Japan | 55/158 |

*Primary Examiner*—Robert Spitzer

[57] ABSTRACT

Polyaramide gas separation membranes and the process of using them are disclosed. The polyaramide gas separation membranes have the formula,

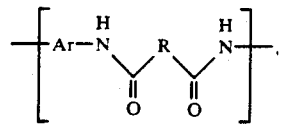

where —R— is

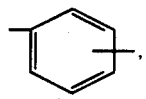

—Ar'— is

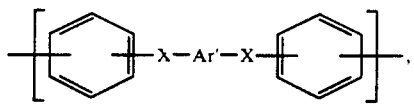

—Ar'— is an aromatic moiety such as phenylene, naphthalene, or

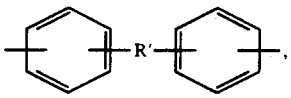

—x— is a divalent radical preferably —o— or

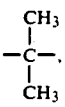

and —R'— is a variety of divalent moieties such as

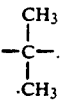

20 Claims, No Drawings

POLYAMIDE GAS SEPARATION MEMBRANES AND PROCESS OF USING SAME

BACKGROUND OF THE INVENTION

1. Field of the Invention

The present invention relates to aromatic polyamide gas separation membranes and the process for separating one or more gases from a gaseous mixture using such membranes. The polyamides are derived from a variety of aromatic diacyl chlorides, including some conventionally used to form gas separation membranes, and certain diamines containing two or more benzene rings.

2. Prior Art

U.S. Pat. No. Re 30,351, U.S. Pat. No. 3,822,202 and, U.S. Pat. No. 3,899,309 disclose gas separation membrane materials comprising certain semi-rigid aromatic polyamides, polyimides and polyester.

U.S. Pat. No. 3,567,632 discloses reverse osmosis membranes composed of aromatic nitrogen-linked polymers.

U.S. Pat. No. 4,217,227 discloses aromatic copolyamide reverse osmosis membrane materials which compositionally incorporate chain-extended diamine residues.

U.S. Pat. No. 4,595,503 discloses ultrafiltration membranes prepared from aliphatic polyamide materials.

U.S. Pat. No. 4,627,992 discloses ultrafiltration membranes prepared from aromatic polyamides.

U.S. Pat. No. 4,659,383 discloses reverse osmosis membranes prepared from polyamide materials.

U.S. Pat. No. 4,713,438 discloses certain polyamide compositions which incorporate chain-extended diamine residues.

U.S. Pat. No. 4,737,286 discloses microporous polyamide membranes.

U.S. Pat. No. 4,770,777 discloses microporous membranes prepared from aliphatic polyamides.

EPO 219,878 discloses gas separation polyamide membrane materials which compositionally incorporate heavily substituted phenylene diamine residues.

SUMMARY OF THE INVENTION

The present invention relates to certain polyamide separation membranes particularly useful for separating gases and the process for using them. This class of polyamide membrane materials compositionally contain diamine residues which incorporate greater than two aromatic units in the polymer chain. Membranes formed from this class of polyamide materials have improved environmental stability and superior gas productivity. The high selectivities of some gases from multicomponent mixtures is due to the optimization of the molecular free volume in the polymer. These diamines have the amino groups attached to benzene nuclei which in turn are bridged to at least one aromatic nucleus by any of various divalent radicals.

DETAILED DESCRIPTION

The present invention relates to the discovery that gas separation membranes exhibiting exceptional gas permselectivity can be obtained by forming such gas separation membranes from polyaramides which incorporate diamine residues derived from diamines of the following structural formula

where —Ar— is

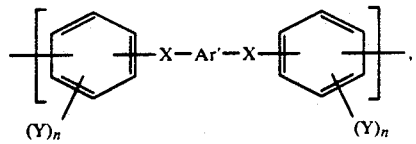

where —Ar'—is:

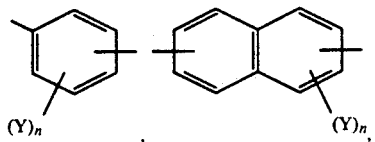

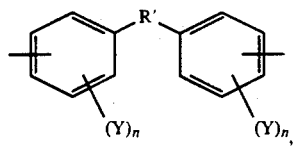

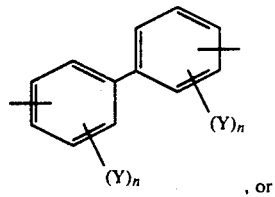

, or mixtures thereof. —X— is —O—, —S—, —C(=O)—, —C(CF$_3$)$_2$—,

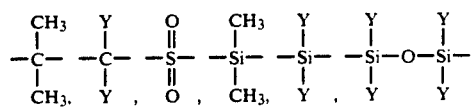

or mixtures thereof, preferably —O— or

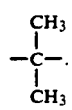

—Y is independently —H, alkyl groups having 1 to 6 carbon atoms, aromatic groups having 6 to 12 carbon atoms, or halogen such as —F, —Cl, Br, or —I, preferably phenyl or —H, where n is an integer from 0 to 4 and —R'— is

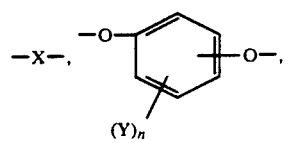

-continued

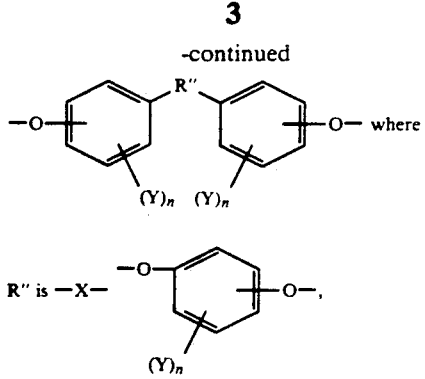

or mixtures thereof.

Gas separation membranes prepared from such materials possess an excellent balance of gas permeation rates and selectivities of one gas over other gases in a multicomponent gas mixture. The high gas productivity of these membranes is believed to be due to the optimization of the molecular free volume in the polymer structure resulting from the incorporation of said diamine-residues in the polyamide chain.

The present invention provides high productivity polyamide gas separation membranes of which at least 50% by weight consists essentially of a polymer represented by the repeating unit,

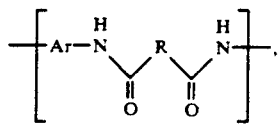

where —Ar— has the meaning defined above, and —R— is

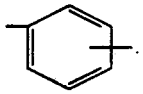

As a further benefit, the preferred polyamide compositions of the present invention are soluble in ordinary organic solvents. This is a great advantage for the ease of fabrication of industrially useful gas separation membranes. These soluble polyamides can be solution cast on porous solvent resistant substrates to serve as the dense separating layer of the composite membrane. Alternatively, they can be solution cast as dense or asymmetric membranes.

As compared with prior polyamide compositions for use in gas separation membranes described herein, the polyamide compositions of the present invention are relatively more hydrophobic. This is potentially of great benefit for the ease of manufacture of commercial gas separation membranes. Complex dehydration procedures for polyamide membranes have been taught in the prior art; for example, U.S. Pat. No. 4,080,743, U.S. Pat. No. 4,080,744, U.S. Pat. No. 4,120,098, and EPO 219,878. As one skilled in the art can appreciate, such arduous membrane dehydration procedures can be greatly simplified with more hydrophobic polyamide materials described herein.

The polyamides of the present invention have high inherent thermal stabilities. They are generally stable up to 350° C. in air or inert atmospheres. The glass transition temperatures of these polyamides are generally above 200° C. The high temperature characteristics of these polyamides can help to prevent the membrane compaction problems observed in other polymers at even moderate temperatures.

The polyamide membranes disclosed herein have found use in gas separations. The polyamide membranes of the present invention find use in the enrichment of oxygen and nitrogen from air for increased combustion or inerting streams, respectively; in recovery of hydrogen in refinery and ammonia plants; separation of carbon monoxide from hydrogen in syngas systems; and separation of carbon dioxide or hydrogen sulfide from hydrocarbons.

EXAMPLES

Example 1

To a stirred solution of 2,2-bis[4-(4-aminophenoxy)-phenyl]propane,

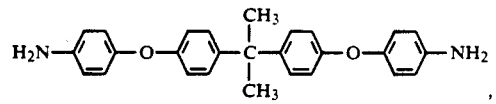

(41.0 g, 0.10 mol) in N-methylpyrrolidone (350 ml) was dropwise added a melted mixture of isophthaloyl dichloride:terephthaloyl dichloride (7:3, mol ratio, 20.3 g, 0.10 mol) under an inert atmosphere. The reaction temperature was maintained at under 50° C. by control of the addition rate. After the very viscous, golden reaction solution had stirred for 4 hours, lithium hydroxide monohydrate (10.49 g, 0.25 mol) was added and the resulting reaction mixture was allowed to stir overnight at room temperature. The reaction solution was diluted with additional N-methylpyrrolidone and precipitated in water. The resulting solid was collected and washed 3 times with water, washed 3 times with methanol and allowed to air dry overnight. The solid was further dried in a vacuum oven at 20 inches (0.51 m) mercury and 120° C. for 6 hours to yield 50.9 g product.

The polymer prepared above was found to be soluble in m-cresol, dimethyl sulfoxide, N,N-dimethylacetamide and N-methylpyrrolidone.

Films of the polymer prepared above were cast from a 15% polymer solution (based on weight) in N-methylpyrrolidone onto a glass plate treated with Du Pont TEFLON ® dry lubricant at 100° C.±2° C. with a 15-mil (38.4×10$^{-5}$ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

Du Pont TEFLON ® dry lubricant contains a fluorocarbon telomer which reduces the adhesion of the membrane to the glass plate.

A film prepared as above which was 1.34 mils (3.4×10$^{-5}$ m) thick, was tested for mixed gas oxygen/-nitrogen (21/79, mole) permeabilities at 490.3 psig (3380 kPa), 26.2° C. The results are reported below:

$O_2$ Productivity: 54 centiBarrers
$O_2/N_2$ Selectivity: 6.37

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in centimeters mercury (cm Hg), i.e., $$\text{centiBarrer} = 10^{-12} \frac{\text{cm}^3 \text{ (STP)cm}}{\text{cm}^2 \text{ sec cmHg}}$$

Example 2

To a stirred solution of 4,4′-[1,3-phenylenebis(1-methylethylidene)]bisaniline,

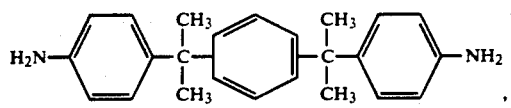

(50.0 g, 0.145 mol) in pyridine (27.6 g, 0.35 mol) and N-methylpyrrolidone (600 ml) was dropwise added a melted mixture of isophthaloyl dichloride:terephthaloyl dichloride (7:3, molar, 29.51 g, 0.145 mol) under an inert atmosphere. The reaction temperature was maintained at under 50° C. by control of the addition rate. The resulting viscous solution was stirred at 53° C.±4° C. for one hour and then precipitated in water. The resulting white solid was collected and washed four times with water, washed twice with methanol, and allowed to air dry overnight. The solid was further dried in a vacuum oven at 20 inches (0.51 m) mercury and room temperature overnight and at 150° C. for 4 hours to yield 66.9 g product.

Films of the polymer prepared above were cast from a 10% polymer solution (based on weight) in N-methylpyrrolidone onto a glass plate treated with Du Pont TEFLON ® dry lubricant at 85° C.±2° C. with a 15-mil ($38.4 \times 10^{-5}$ m) knife gap. After drying on the plate at 85° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.0 mils ($2.54 \times 10^{-5}$ m) thick, was tested for mixed gas oxygen/nitrogen (21/79, mole) permeabilities at 483.7 psig (3335 kPa), 26.0° C. The results are reported below:
$O_2$ Productivity: 31 centiBarrers
$O_2/N_2$ Selectivity: 6.6

Films of the polymer prepared as above were cast from a 15% polymer solution (weight) in N-methylpyrrolidone onto a glass plate treated with Du Pont TEFLON ® dry lubricant at 80° C. with a 15 mil ($38.4 \times 10^{-5}$ m) knife gap. The films were dried on a plate at 80° C. for 30 minutes, cooled to room temperature and dried in a vacuum oven at 20 inches (0.51 m) mercury and room temperature overnight. The films were stripped off the plate and dried in a vacuum oven at 20 inches (0.51 m) mercury and 120° C. for 4 hours. The films were then tested for mixed gas $H_2/CH_4$ (50/50 mole) permeabilities at 400 psig ($276 \times 10^4$ Pa), 25° C. Results are reported below:
$H_2$ Productivity: 350 centiBarrers
$H_2/CH_4$ Selectivity: 52

Example 3

To a stirred solution of 4,4′[1,4-phenylenebis(1-methylethylidene)] bisaniline,

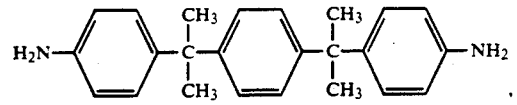

(344.0 g, 1.0 mol) in N-methylpyrrolidone was dropwise added a melted mixture of isophthaloyl dichloride:terephthaloyl dichloride (7:3, molar, 203.02 g, 1 mol) under an inert atmosphere. The reaction temperature was maintained at under 50° C. by control of the addition rate. The resulting very viscous, clear, tan solution was stirred for 2.5 hours after the final addition. To the rapidly stirred reaction solution was added lithium hydroxide monohydrate (92.31 g, 2.2 mol) and the resulting reaction mixture stirred overnight at room temperature. The reaction solution was diluted with additional N-methylpyrrolidone and precipitated in water. The resulting white solid was collected, washed twice with water, washed twice with methanol and air-dried overnight. The solid was then further dried in a vacuum oven at 20 inches (0.51 m) mercury and 120° C. for 6 hours to yield 497.7 g product.

Films of the polymer prepared above were cast from a 10% polymer solution (based on weight) in N-methylpyrrolidone onto a glass plate treated with Du Pont TEFLON ® dry lubricant at 85° C.±2° C. with a 15-mil ($38.4 \times 10^{-5}$ m) knife gap. After drying on the plate at 85° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) and 120° C. for 4 hours. The films were tough and flexible and could be creased without cracking.

A film, prepared as above which was 0.9 mils ($2.3 \times 10^{-5}$ m) thick, was tested for mixed gas oxygen/nitrogen (21/79, mole) permeabilities at 482.4 psig (3326 kPa), 27.1° C. The results are reported below:
$O_2$ Productivity: 60 centiBarrers
$O_2/N_2$ Selectivity: 6.1

Example 4

To a stirred solution of 4,4′-[1,4-phenylenebis(1-methylethylidene)] bisaniline (50 g, 0.145 mol) and pyridine (27.6 g, 0.349 mol) in N-methylpyrrolidone (1 L) at room temperature under an atmosphere of nitrogen was dropwise added a mixture of isophthaloyl dichloride: terephthaloyl dichloride (70:30) (mole) (29.51 g, 0.145 mol, melted). The reaction temperature was controlled at ≦40° C. by the rate of addition. After the final addition, the reaction mixture was warmed to 50° C. for 2 hours. The viscous golden-yellow solution was precipitated in water and the resulting solid was washed four times with 3 L water and twice with 2 L methanol. The white solid was air dried and then dried in a vacuum oven at 20 inches (0.51 m) mercury and room temperature for 4 hours and at 150° C. for 4 hours to give 66.0 g product.

Differential Scanning Calorimetry (DSC) was performed on the polymer using a Du Pont Thermal Analyzer Model 990 with a Du Pont cell, baseline scope=50 in a nitrogen atmosphere at a 10° C./minute progress rate. A transition was observed with an onset at 259.6° C., a midpoint at 264.7° C., and an end at 269.8° C.

Thermogravimetric Analysis (TGA) was performed on the polymer using a Du Pont Thermogravimetric Analyzer Model 99 with a Du Pont cell in an air atmosphere at a 10° C./minute progress rate. A 5% weight loss was observed at 400° C. and a 40% weight loss was observed at 550° C.

Films were cast from a 15% polymer solution (weight) in N-methylpyrrolidone onto a glass plate treated with Du Pont TEFLON ® dry lubricant at 85° C. with a 15 mil (38.4×10⁻⁵ m) knife gap. The films were dried on a plate at 85° C. for 35 minutes, cooled to room temperature and dried in a vacuum oven at 20 inches (0.51 m) mercury and room temperature overnight. The films were stripped off the plate and dried in a vacuum oven at 20 inches (0.51 m) mercury and 120° C. for 4 hours. The films were then tested for mixed gas $H_2/CH_4$ (50/50)(mole) permeabilities at 400 psig (276×10⁴ Pa), 25° C. Results are reported below:

$H_2$ Productivity: 660 centiBarrers
$H_2/CH_4$ Selectivity: 88

Example 5

To a stirred solution of 2,7-bis(4-aminophenoxy)-naphthalene,

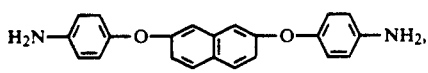

(25.0 g, 0.073 mol) in N-methylpyrrolidone (200 ml) was dropwise added a melted mixture of isophthaloyl dichloride:terephthaloyl dichloride (7:3, molar, 15.14 g, 0.075 mol) under an inert atmosphere. The reaction temperature was maintained at under 50° C. by control of the addition rate. The resulting viscous solution was stirred for one hour after the final addition and then lithium hydroxide monohydrate (10.50 g, 0.25 mol) was added. The resulting reaction mixture was stirred overnight at room temperature, diluted with N-methylpyrrolidone and precipitated in water. The resulting white solid was collected and washed three times with water and twice with methanol. The resulting solid was air dried overnight and then dried in a vacuum oven at 20 inches (0.51 m) mercury and 120° C. for 5 hours to yield 34.64 g product.

Films of the polymer prepared above were cast from a 15% polymer solution (based on weight) in N-methylpyrrolidone onto a glass plate treated with Du Pont TEFLON ® dry lubricant at 100° C.±2° C. with a 15-mil (38.4×10⁻⁵ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.45 mils (3.68×10⁻⁵ m) thick, was tested for mixed gas oxygen/nitrogen (21/79, mole) permeabilities at 484.6 psig (3341 kPa), 25.4° C. The results are reported below:

$O_2$ Productivity: 17 centiBarrers
$O_2/N_2$ Selectivity: 7.1

Example 6

To a stirred solution of bis [4-(4-aminophenoxy)-phenyl]sulfone,

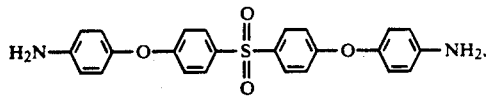

(49.71 g, 0.115 mol) in pyridine (70 mol) and N,N-dimethylacetamide (350 ml) was dropwise added melted isophthaloyl dichloride (23.26 g, 0.15 mol) under an inert atmosphere. The reaction temperature was maintained at under 50° C. by control of the addition rate. The resulting reaction solution was stirred for 3 hours after the final addition and then lithium hydroxide monohydrate (10.0 g, 0.24 mol) was added. The resulting reaction mixture was stirred overnight at room temperature and then precipitated in methanol. The resulting solid was soaked in water overnight, washed with water, washed twice with methanol and allowed to air dry overnight. The solid was further dried in a vacuum oven at 20 inches (0.51 m) mercury and 120° C. for 6 hours to yield 67.0 g product.

Films of the polymer prepared above were cast from a 10% polymer solution (based on weight) in N-methylpyrrolidone onto a glass plate treated with Du Pont TEFLON ® dry lubricant at 100° C.±2° C. with a 15-mil (38.4×10⁻⁵ m) knife gap. After drying on the plate at the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.3 mils (3.3×10⁻⁵ m) thick, was tested for mixed gas oxygen/nitrogen (21/79, mole) permeabilities at 483.0 psig (3330 kPa), 26.4° C. The results are reported below:

$O_2$ Productivity: 32 centiBarrers
$O_2/N_2$ Selectivity: 6.6

Example 7

To a stirred solution of bis-1,4-(4-aminophenoxy)benzene,

(29.2 g, 0.10 mol) and bis-1,3-(4-aminophenoxy benzene) 29.2 g, 0.10 mol) in N-methylpyrrolidone (500 ml) was dropwise added a melted mixture of isophthaloyl dichloride:terephthaloyl dichloride (7:3, molar, 40.60 g, 0.20 mol) under an inert atmosphere. The reaction temperature was maintained at under 50° C. by control of the addition rate. To the resulting very viscous, orange solution was added lithium hydroxide monohydrate (21.0 g, 0.50 mol). The resulting reaction solution was stirred for 2 hours and then diluted with additional N-methylpyrrolidone and precipitated in water. The resulting solid was soaked in water overnight, washed with water, washed twice with methanol and allowed to air dry overnight. The solid was further dried in a vacuum oven at 20 inches (0.51 m) mercury and 125° C. for 5 hours.

Films of the polymer prepared above were cast from a 10% polymer solution (based on weight) in N-methyl-pyrrolidone onto a glass plate treated with Du Pont TEFLON ® dry lubricant at 100° C.±2° with a 20-mil (51×10⁻⁵ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.80 mils (4.57×10⁻⁵ m) thick, was tested for mixed gas oxygen/nitrogen (21/79, mole) permeabilities at 110.2 psig (760 KPa), 25.4° C. The results are reported below:
$O_2$ Productivity: 23 centiBarrers
$O_2/N_2$ Selectivity: 7.4

I claim:

1. A process for separating at least one gas from a gaseous mixture comprising bringing said gaseous mixture into contact with one side of a gas separation membrane whereby one or more of the gases permeates said membrane preferentially, said membrane being formed of a polyaramide of film forming molecular weight having the formula

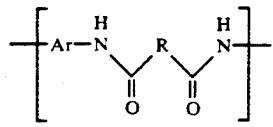

where —R— is the formula,

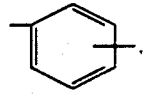

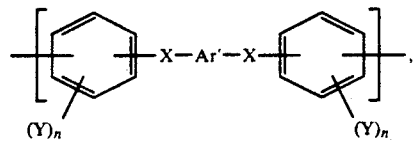

and —Ar'— is
where —Ar'— is selected from the group consisting of

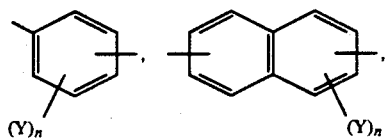

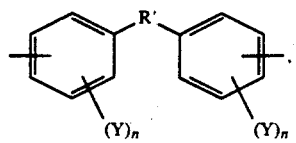

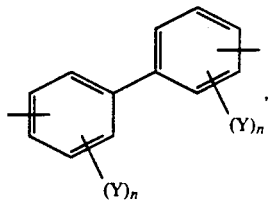

or mixtures thereof, —X— is —O—, —S—,

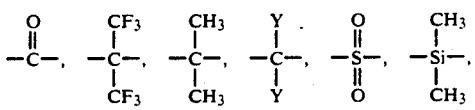

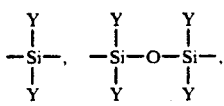

or mixtures thereof, —Y is independently —H, alkyl groups having 1 to 6 carbon atoms, aromatic groups having 6 to 12 carbon atoms, or halogen, where n is an integer from 0 to 4 and —R'— is —X—,

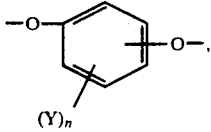

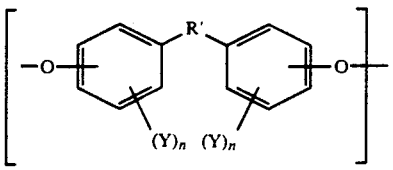

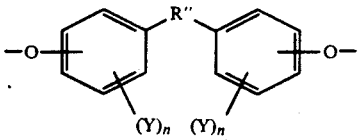

where R" is —X— or

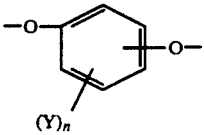

or mixtures thereof.

2. The process of claim 1 wherein —Y is phenyl or —H.

3. The process of claim 1 wherein —Y is —H.

4. The process of claim 3 wherein —Ar'— is

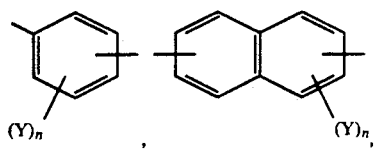

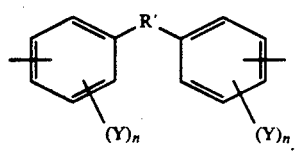

5. The process of claim 4 wherein —x— is —o— or

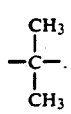

6. The process of claim 5 wherein —R'— is

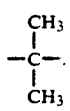

7. The process of claim 6 wherein —Ar— is

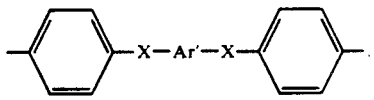

8. The process of claim 7 wherein —Ar'— is

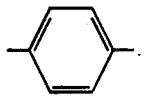

9. The process of claim 8 wherein —x— is

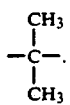

10. The process of claim 8 wherein —x— is —o—.

11. (Amended). A polyaramide gas separation membrane formed of a polyaramide of film forming molecular weight of the formula,

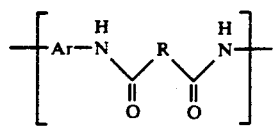

where —R— is

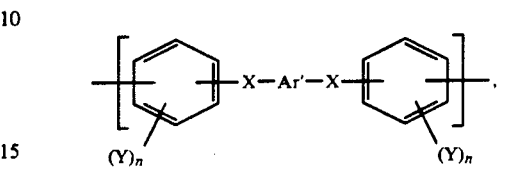

and —Ar— is

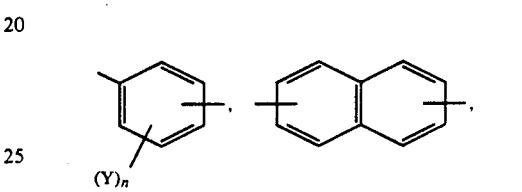

where —Ar'— is selected from the group consisting of

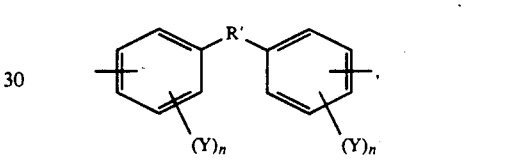

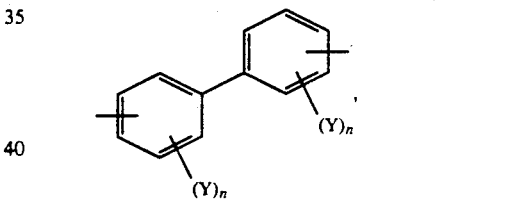

or mixtures thereof, —X— is —O—, —S—,

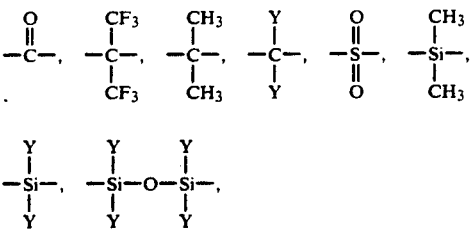

or mixtures thereof, —Y is independently —H, alkyl groups having 1 to 6 carbon atoms, aromatic groups having 6 to 12 carbon atoms, or halogen, where n is an integer from 0 to 4 and —R'— is —X—,

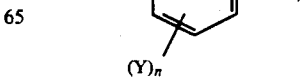

-continued

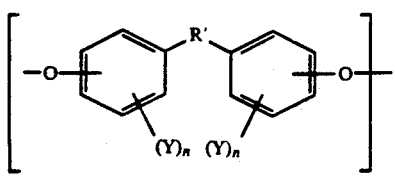

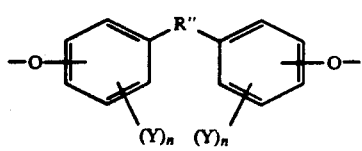

where R" is —X— or

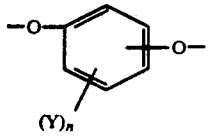

or mixtures thereof.

12. The gas separation membrane of claim 11 wherein —Y is phenyl or —H.

13. The gas separation membrane of claim 12 wherein —Y is —H.

14. The gas separation membrane of claim 13 wherein —Ar'— is

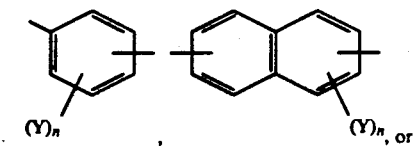

-continued

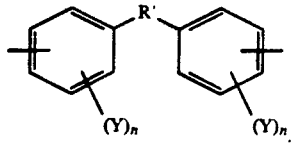

15. The gas separation membrane of claim 14 wherein —x— is —O— or

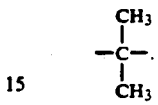

16. The gas separation membrane of claim 15 wherein —R'— is

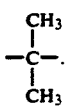

17. The gas separation membrane of claim 16 wherein —Ar— is

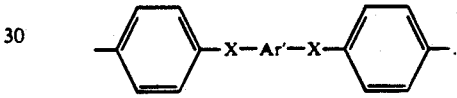

18. The gas separation membrane of claim 17 wherein —Ar'— is

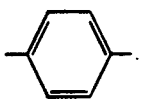

19. The gas separation membrane of claim 18 wherein —x— is

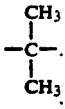

20. The gas separation membrane of claim 18 wherein —x— is —O—.

* * * * *

UNITED STATES PATENT OFFICE
CERTIFICATE OF CORRECTION

PATENT NO.  : 5,076,817
DATED       : Dec. 31, 1991
INVENTOR(S) : Richard A. Hayes It is certified that error appears in the above-identified patent and that said Letters Patent is hereby corrected as shown below:

Claim 1, column 10, lines 40 to 45, formula should be deleted.
Claim 11, column 11, line 57, "(Amended)" should be deleted.
Claim 11, column 13, lines 1 to 10, formula should be deleted.

Signed and Sealed this

Twentieth Day of April, 1993

Attest:

MICHAEL K. KIRK

*Attesting Officer*  *Acting Commissioner of Patents and Trademarks*